Feb. 15, 1949.  J. L. BURDOCK ET AL  2,461,677
APPARATUS FOR SEPARATING SUSPENDED
PARTICLES FROM GASES
Filed May 8, 1947  4 Sheets-Sheet 1
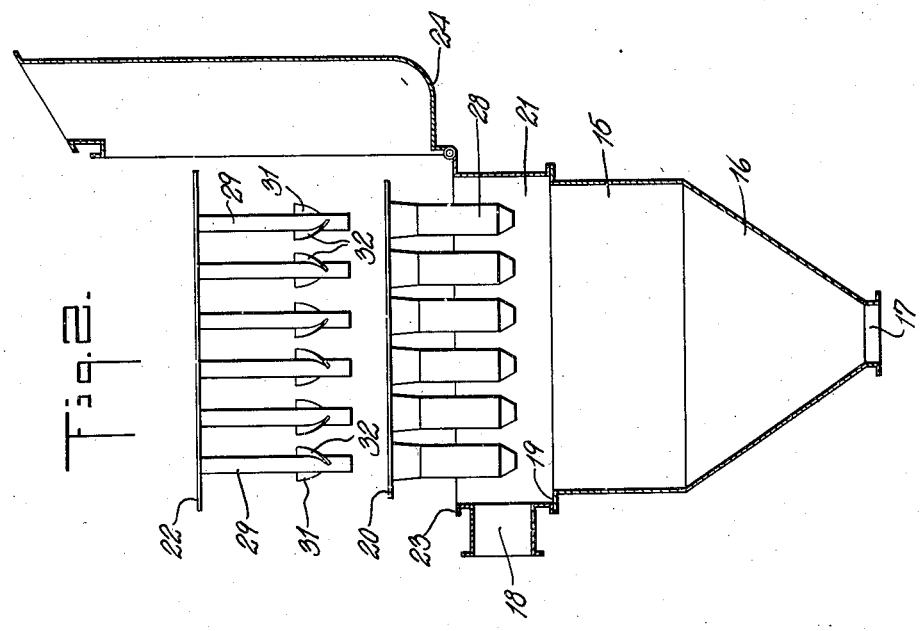
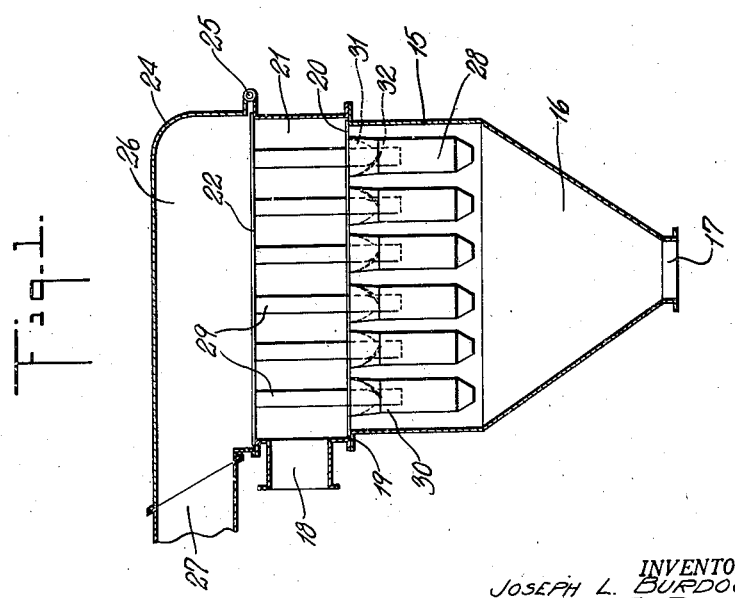
INVENTORS
JOSEPH L. BURDOCK
PHILIP F. BEST
BY CHARLES B. McBRIDE
ATTORNEY

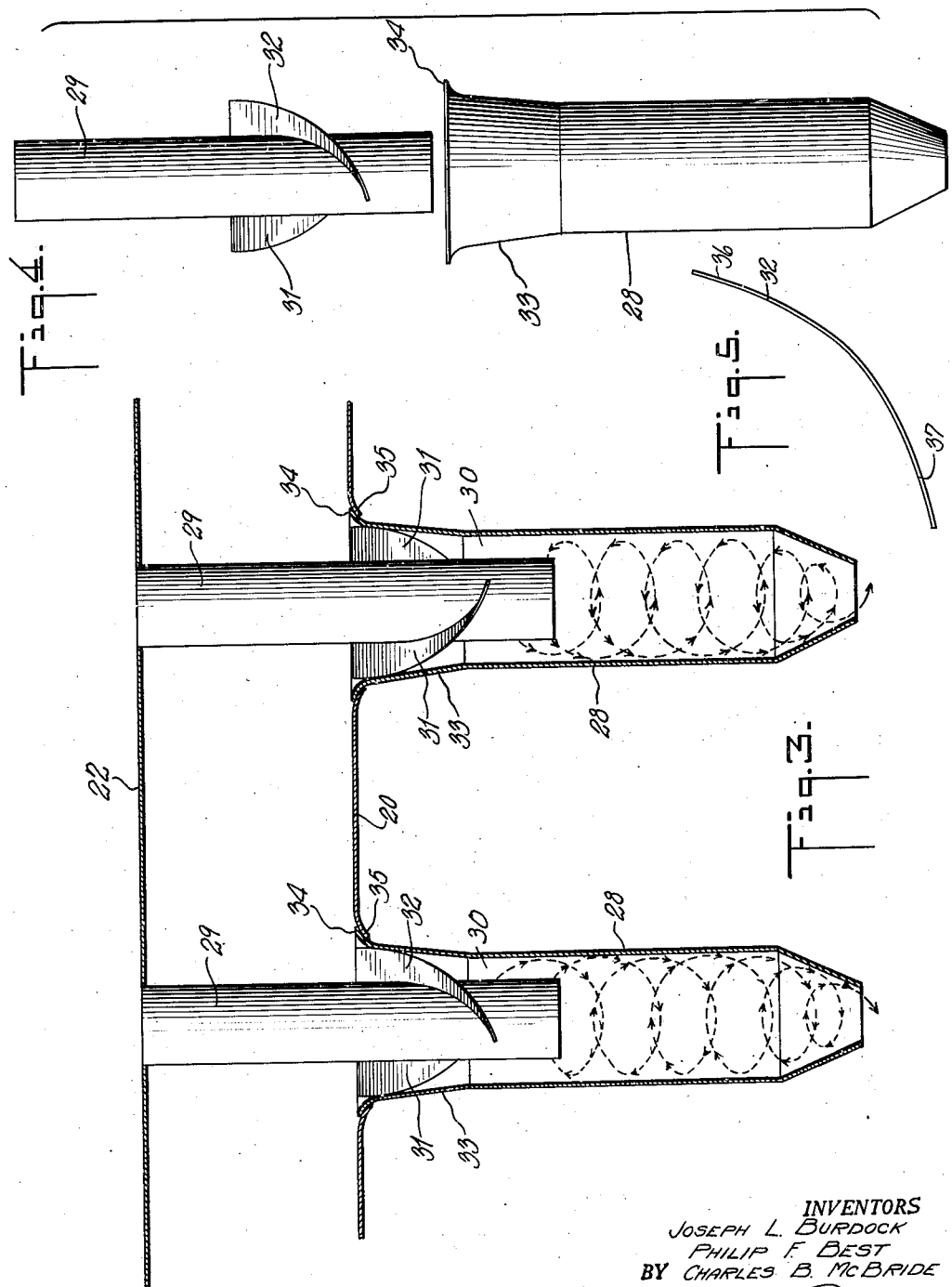

INVENTORS
JOSEPH L. BURDOCK
PHILIP F. BEST
BY CHARLES B. MCBRIDE

Benj. T. Rauber
ATTORNEY

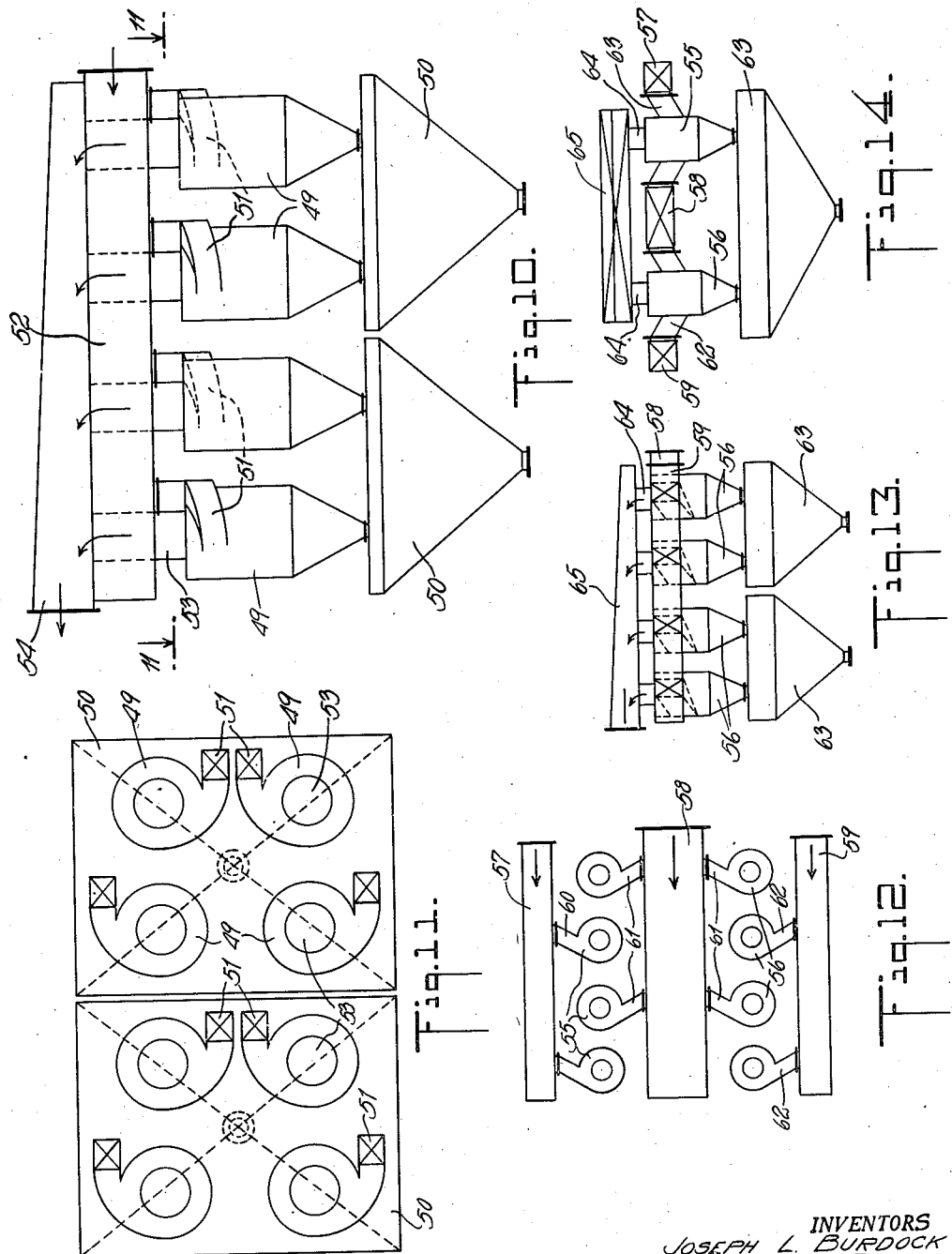

Patented Feb. 15, 1949

2,461,677

UNITED STATES PATENT OFFICE

2,461,677

APPARATUS FOR SEPARATING SUSPENDED PARTICLES FROM GASES

Joseph L. Burdock, Old Greenwich, and Philip F. Best, Riverside, Conn., and Charles B. McBride, Port Chester, N. Y., assignors to The Aerotec Corporation, White Plains, N. Y., a corporation of New York Application May 8, 1947, Serial No. 746,746

4 Claims. (Cl. 183—81)

Our present invention relates to apparatus for separating suspended particles in gases. More particularly it relates to apparatus which centrifugally separates light finely divided organic materials, such as food or vegetable products, from air or gas in which the materials are carried.

Certain materials of the above type, as for example dust from alfalfa or grain, present special difficulties because of the tendency, due to their extreme lightness, to float in a receiving receptacle or bin and to pass therefrom back into centrifugal separating tubes and to be carried out with the clean air or gas.

Certain of these materials also have a tendency to collect gradually in parts of the apparatus which must, therefore, be periodically cleaned to insure that there shall be no accumulation of foodstuffs which might deteriorate and contaminate the recovered product.

It is also necessary to avoid or prevent any tendency for these materials to collect and pack in any part of the apparatus in such a manner as to plug or stop it from efficient operation.

In our present invention we provide a centrifugal separating apparatus in which the parts may be readily separated for cleaning and be easily assembled and which avoids any tendency for very fine light separated particles to collect or accumulate in any part of the apparatus other than the dust receiving receptacle, or to float back into the exhaust cleaned air of the centrifugal separator.

Our invention is applicable to apparatus in which a number of centrifugal separators are arranged in parallel into one end of each of which extends an off-take pipe leaving an annular space into which an inlet, or inlets, directs air or gases circularly or helically to separate the suspended particles centrifugally. The clean air enters the open ends of the off-take pipes while the separated particles are discharged from the opposite or lower end into a common bin.

In our present invention rotary circulation of air in the bin is avoided by so arranging the inlets to successive or adjacent separators as to cause the gases in adjacent separators to rotate alternately in opposite directions, that is, clockwise in one separator and counterclockwise in an adjacent separator.

As the gases continue their rotary motion when discharged into the dust collecting bin these opposed rotations will counteract each other and prevent any general rotational movement in the dust bin which might cause the lighter particles of dust to separate and float back into the central parts of the respective separators and be carried out with the exhaust or cleaned air.

The inlets may be arranged in any number of ways, either by separate ducts or by tangential inlets to the respective centrifugal separator tubes.

To enable the apparatus to be readily disassembled and assembled we provide in one embodiment of our invention a bin for receiving and collecting the separated particles having a separating ledge on which may rest a partition plate carrying a number of centrifugal separating tubes which open at their outlet ends downwardly into the dust receiving bin. This permits the plate and centrifugal tubes to be readily lifted from the dust bin so that all parts are accessible for cleaning.

Above the supporting ledge the bin is provided with an inlet, and above the inlet is a second partition plate which may rest upon the upper edge, or a suitable supporting ledge of the bin, so as to form a plenum chamber in the space between the two plates.

The upper plate carries outlet or exhaust pipes so spaced and positioned that each projects downwardly into a corresponding centrifugal tube and is provided with vanes spanning the upper part of the respective centrifugal tubes so as to form spiral passages. When the upper plate is removed and separated from the lower plate the off-take pipes and the spiral vanes are freely exposed for cleaning.

A hinged cover having an outlet is mounted on the upper part of the bin so as to swing downwardly onto the upper plate and form an off-take chamber. When the cover is swung out of position and the plates are separated and removed all parts of the apparatus are freely accessible.

The various features of our invention are illustrated by way of example in the accompanying drawings in which Fig. 1 is a vertical section of a separating apparatus embodying one form of the invention;

Fig. 3 is a vertical section on a larger scale of a pair of adjacent separating tubes or elements of the apparatus shown in Figs. 1 and 2;

Fig. 4 is a side view of one of the separating tubes or elements showing the off-take pipe in separated position;

Fig. 5 is a development of an edge of a directing vane of the tube of Fig. 4;

Fig. 7 is a horizontal section of the tube taken on line 7—7 of Fig. 6;

Fig. 10 is a side view of a number of centrifugal separators of a still different type arranged in accordance with our invention;

Fig. 11 is a plan view partly in section taken on the line 11—11 of Fig. 10;

Fig. 12 is a plan view of another form of embodiment of our invention;

Figs. 13 and 14 are respectively side and end elevations of the apparatus as shown in Fig. 12.

Figure 2:
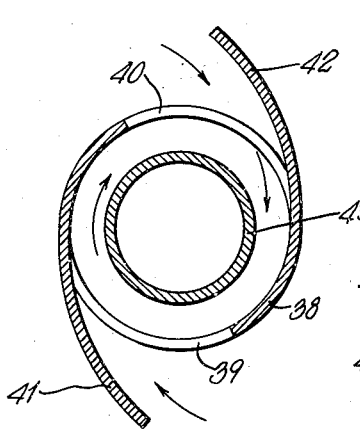
Fig. 2 is a section similar to that of Fig. 1 showing various elements of the apparatus separated for removal and cleaning.

Referring more particularly to Figs. 1 and 2 the separating apparatus comprises a collecting bin 15 having a downwardly tapered bottom 16 to form a collecting hopper and outlet 17 for the removal of collected particles and having an inlet 18 at one side near the upper end of the bin. Somewhat below the inlet 18 the bin is provided with an inwardly projecting shoulder or ledge 19 to serve as a support for a partition plate 20 which when supported on the ledge 19 separates the bin into a lower dust collecting or depositing chamber, indicated at 16, and a plenum or supply chamber 21. The supply chamber 21 is closed by a cover plate 22 which rests on the supporting surface or ledge 23 on the upper end of the bin 15. A cover 24, preferably hinged to the bin 15 as at 25, closes down on the plate 22 to form an off-take chamber 26 and is provided with a suitable outlet opening 27.

The partition plate 20 is provided with suitably spaced openings in which may be mounted the upper ends of centrifugal tubes 28, but the lower ends of which open downwardly into the collecting hopper 16. The tubes 28 are raised with the plate 20 when the latter is lifted from the ledge 19, as shown in Fig. 2, and as the assembly of plate 20 and tubes 28 is thus removed from the bin 15 it is freely open for cleaning.

Similarly the plate 22 is provided with spaced openings in which are mounted off-take pipes 29 in such position that they are co-axial with their respective tubes 28 and form in each of the latter an annular downwardly open passage 30.

As shown in Fig. 2 the plate 22 is removed before the removal of the plate 20 and accordingly the off-take pipes are lifted free of the centrifugal tubes 28. This exposes all parts of the off-take tubes for inspection and cleaning.

Mounted on each off-take tube 29 are vanes 31 and 32 so positioned as to fit into and span the upper part of the annual passage 30 in the respective tubes 28 and thus form a downward spiral passage for gases from the plenum chamber 21 into the various tubes 28.

As shown in Figs. 1, 2 and more particularly in Fig. 3, the vanes 31 and 32 of one tube are arranged in reverse relation to those of an adjacent tube so that if the gas or air in one tube is rotated clockwise, when viewed from above or below respectively, the air or gas in the adjacent tube will rotate counterclockwise.

Consequently as the rotating gases leave the lower ends of the tubes 28 with a residual rotational movement the rotation of one tube will oppose that of the adjacent tube and counteract it so as to prevent the setting up of a rotational whirl throughout the hopper 16 which would tend to lift the lighter particles into the rotating air from which they could rise through a central vortex into the off-take pipes 29.

It will be understood that any number of rows of tubes can be so arranged as indicated in the latter figures (8–14), and that in this case they would be arranged in a checkerboard manner.

The tubes 28 are slightly flared toward their upper or inlet ends as indicated at 33 in Figs. 3 and 4 and have a bell shaped upper edge 34 which fits onto correspondingly downwardly curved edges 35 of the openings in the plate 20. This enables the tubes 28 to be readily inserted in and removed from the openings in the plate 20.

The vanes 31 and 32 are mounted on the off-take pipes 29 and are similarly shaped to fit in contact with the flared part 33 of the tubes 28 so as to insure a close fit when the pipes 29 are pressed downwardly into the upper ends of the tubes 28.

The vanes 31 and 32 may have a variable slope as indicated in Fig. 5, the upper end or edge 36 approaching a vertical direction and the lower part 37 having a relatively smaller angle to the horizontal. This enables the air passing downwardly to be given a horizontal rotary direction without an impact or baffling action.

Figure 6:
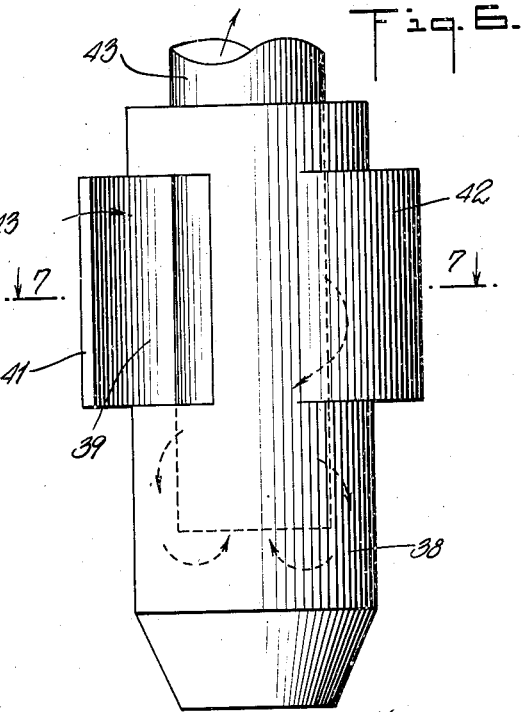
Fig. 6 is a side elevation of another form of separating tube that may be used in our invention.

The assembly of tubes in Figs. 1 to 4 enables the tubes to be very closely spaced. Where this is not essential or desirable the type of tubes shown in Figs. 6 and 7 may be employed. In this case each tube comprises a cylindrical wall 38 closed at its upper end and closed at its lower end and having one or more tangential inlets 39 and 40 formed by cutting or slitting an opening and bending back the metal to form the fins 41 and 42. An off-take pipe 43 projects downwardly into the upper end of the cylindrical tube 38 and terminates at an open end somewhat below the level of the inlets 39 and 40 and thus forms an annular passage into which these inlets deliver.

Figure 8:
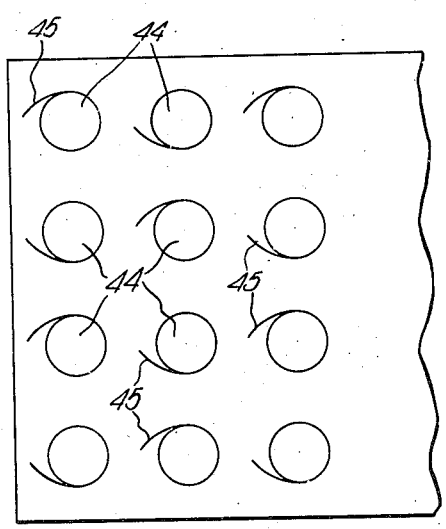
Figs. 8 and 9 are diagrammatic views showing the relation of a number of separating tubes of the type of Figs. 6 and 7 with one and two tangential inlets respectively.

As shown in Fig. 8 tubes 44 having single inlets 45 are so arranged that the direction of rotation of the gases in the tubes is alternately reversed in directions at right angles to give a checkerboard effect to the different rotations.

Figure 9:
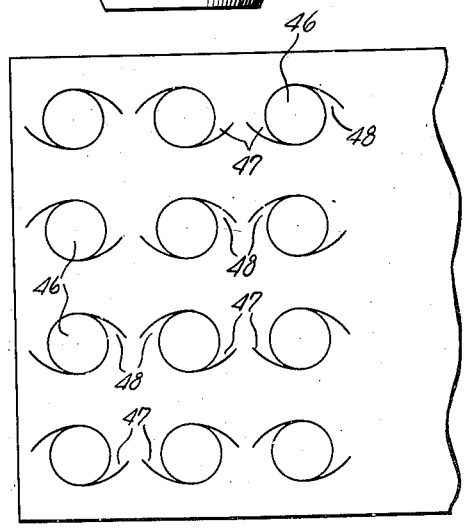

Similarly in Fig. 9 tubes 46 having two inlets 47 and 48 are similarly arranged. It will be understood that this arrangement is shown diagrammatically but that any suitable structures may be employed, such as that shown in Patent No. 2,281,610.

This invention is particularly advantageous with a large number of cylindrical tubular separators closely spaced, but may be employed to advantage with other forms of centrifugal separators delivering into a common dust receptacle or bin.

As shown in Figs. 10 and 11, for example, a number of centrifugal separators 49 deliver into bins 50, the particular embodiment showing four separators for each bin. Each separator is provided with an inlet duct 51 supplied with particle carrying air from a common supply conduit 52, the conduits 52 being arranged as shown in Fig. 11 for alternate reversal of direction of rotation in successive separators.

The cleaned exhaust gases are withdrawn through off-take pipes 53 to an exhaust conduit 54. It will be understood that more than four separators may deliver into a single dust collecting hopper.

The apparatus shown in Figs. 12, 13 and 14 is similar. A number of centrifugal separators 55 and 56 being arranged in rows are supplied from supply conduits 57, 58 and 59 through branches 60, 61 and 62, the branches being arranged to give alternate directions of rotation to the successive separators.

Groups of separators deliver into dust collecting or particle collecting bins 63 while the clean or dust freed air is withdrawn through off-take pipes 64 to a common off-take conduit 65.

Having described our invention, what we claim is:

1. Apparatus for separating suspended particles from gases which comprises an open ended dust bin having a peripheral inner ledge spaced from said open end, a partition plate removably supported on said ledge, said partition plate having spaced openings, centrifugal tubes in said openings and extending into and opening into said dust bin, said dust bin having an inlet above said ledge, a closure plate removably supported on the open end of said bin having openings co-axial with those of said partition plate and off-take pipes one for each centrifugal tube mounted in said closure plate and projecting axially into its respective centrifugal tube to form an annular passage therein, each off-take pipe having radially extending deflecting vanes to fit into and span the upper part of said annular passage at an angle to the length of said annular passage to impart a circulatory motion to gases passing downwardly through said annular passage, and a cover on the open end of said bin to form a chamber above said closure plate, said cover having an outlet.

2. The apparatus of claim 1 in which the upper ends of said centrifugal tubes are flared outwardly to fit said openings in said partition plate.

3. The apparatus of claim 1 in which the vanes of each separator are inclined in an opposite direction to those of adjacent separators.

4. The apparatus of claim 1 in which said closure plate and off-take tubes form a unitary structure which may be lifted freely from the open end of said dust bin when said cover is removed and in which said partition plate and said centrifugal tubes form a unit which may be lifted from said ledge when said closure is removed.

JOSEPH L. BURDOCK.
PHILIP F. BEST.
CHARLES B. McBRIDE.

REFERENCES CITED

The following references are of record in the file of this patent:

UNITED STATES PATENTS

| Number | Name | Date |
| --- | --- | --- |
| 1,723,657 | Pavitt | Aug. 6, 1929 |
| 1,886,548 | Horne et al. | Nov. 8, 1932 |
| 2,086,882 | Seitz | July 13, 1937 |
| 2,341,087 | Dunham | Feb. 8, 1944 |
| 2,433,774 | Madely | Dec. 30, 1947 |

FOREIGN PATENTS

| Number | Country | Date |
| --- | --- | --- |
| 643,656 | Germany | Apr. 14, 1937 |